United States Patent [19]

Ekanadham et al.

[11] Patent Number: 5,978,583
[45] Date of Patent: Nov. 2, 1999

[54] METHOD FOR RESOURCE CONTROL IN PARALLEL ENVIRONMENTS USING PROGRAM ORGANIZATION AND RUN-TIME SUPPORT

[75] Inventors: Kattamuri Ekanadham; Jose Eduardo Moreira; Vijay Krishnarao Naik, all of Yorktown Heights, N.Y.

[73] Assignee: International Business Machines Corp., Armonk, N.Y.

[21] Appl. No.: 08/511,777

[22] Filed: Aug. 7, 1995

[51] Int. Cl.$^6$ ...................................................... G06F 9/44
[52] U.S. Cl. ........................... 395/703; 395/672; 395/674
[58] Field of Search ..................................... 395/703, 704, 395/705, 706, 670, 672, 673, 674, 676, 707

[56] References Cited

U.S. PATENT DOCUMENTS

| | | | |
|---|---|---|---|
| 3,651,484 | 3/1972 | Smeallie | 340/172.5 |
| 4,590,555 | 5/1986 | Bourrez | 364/200 |
| 5,325,525 | 6/1994 | Shan et al. | 395/650 |
| 5,636,376 | 6/1997 | Chang | 395/704 |

OTHER PUBLICATIONS

Darlington et al., "Structured Parallel Programming", IEEE Programming Models for Massively Parallel Computers, pp. 160–169, Sep. 1993.

Thinking Machines CM–5 (Thinking Machines Corp., "The Connection Machine CM–5 Tech. Summary", Cambridge, Mass. Nov. 1992 pp. 53–56, 163–177.

Agerwala et al, "SP2 system architecture", IBM Systems J. V. 34 #2 1995, pp. 152–184.

C. McCann et al, "A Dynamic Processor Allocation Policy for Multi–programmed Shared–Memory Multiprocessors" ACM Trans. on Computer Systems, vol. 11 #2, May 1993, pp. 146–178.

A. Gupta et al, "Making Effective Use of Shared–Memory Multiprocessors:The Process Control Approach", Comp. Systems Lab. Tech. Report #CSL–TR–91–475A 1991.

J. Saltz et al, "Multiprocessors and run–time compilation", Concurrency:Practice and Experience, vol. 3(6), pp. 573–592, Dec. 1991.

C.D. Polychronopoulos, "Multiprocessing versus Multiprogramming", 1989 Intern. Conf. on Parallel Processing. Aug. 8–12, 1989, pp. II 223–230.

D.B. Loveman, "High Performance Fortran" Feb. 1993 pp. 25–42, The High Performance Handbook, MIT Press, Cambridge MA, 1994.

CRAY T3D System Architecture Overview Manual, Cray Research Inc. Eagan, Minn. 1994.

S. Leutenegger et al, "Multiprogrammed Multiprocessor Scheduling Issues" Research Report RC–17642 IBM Res. Div. Feb. 1992.

J. J. Dongarra et al, "An Introduction to the MPI Standard" Apr. Apr. 29, 1995.

*Primary Examiner*—Tariq R. Hafiz
*Assistant Examiner*—Kakali Chaki
*Attorney, Agent, or Firm*—Douglas W. Cameron; Anne V. Dougherty

[57] ABSTRACT

A system and method for dynamic scheduling and allocation of resources to parallel applications during the course of their execution. By establishing well-defined interactions between an executing job and the parallel system, the system and method support dynamic reconfiguration of processor partitions, dynamic distribution and redistribution of data, communication among cooperating applications, and various other monitoring actions. The interactions occur only at specific points in the execution of the program where the aforementioned operations can be performed efficiently.

18 Claims, 3 Drawing Sheets

METHOD FOR RESOURCE CONTROL IN PARALLEL ENVIRONMENTS USING PROGRAM ORGANIZATION AND RUN-TIME SUPPORT

This invention was made with Government support under HPCCPT-1 Cooperative Research Agreement No. NCC2-9000 awarded by NASA. The Government has certain rights under this invention.

FIELD OF THE INVENTION

The invention relates to the control of resources in a parallel computing environment.

BACKGROUND OF THE INVENTION

When a program is executed on a multiple resource system, many resources may be used to execute the program to completion. Depending on the requirements of the program, different kinds of resources may be required to run the program to completion. For example, a program requires processing resources for executing the program and for manipulation of data; it also requires memory to store intermediate and final results; and it may require resources of a file system. A program may be constructed so that multiple resources of the same kind can be used in order to speed up the program execution or to handle larger problem sizes and/or larger data sets. The resources used by a program may be allocated at the beginning of program execution or may be allocated during the course of execution just prior to its use. For example, all memory used by a program during the course of execution might be allocated only once at the beginning of program execution or instead might be allocated during execution just prior to generation of data and then deallocated when no longer necessary. Resources may be requested by a program explicitly or implicitly. In an explicit allocation, the program makes a request for specific resources explicitly; for example, a program may request a certain amount of memory or may request a specific set of processors prior to commencing the computations. Implicit resource allocation takes place as a result of use or allocation of some other resource (which may have been allocated explicitly or implicitly). An example of implicit allocation is the allocation of additional pages (in a virtual memory environment) as a result of explicit memory allocation by the program. Another example is the case of implicit allocation of a larger amount of memory to a parallel program when it is run on a larger number of processors in a distributed memory environment.

In the context of a uniprocessor environment, allocation of resources to a sequential program is well defined. Resource allocation requests can be made explicitly by an application program or can be inferred by a compiler from language constructs. A run-time environment or the operating system can make these resources available dynamically either in anticipation or on demand. In a uniprocessor environment resources have well defined boundaries; i.e., the number of resources of each kind is fixed (usually one of each kind) and the size of a particular resource (e.g., real or virtual memory size) is also fixed. Compilers and run-time systems (operating system and extensions of it) can take advantage of these predefined resource boundaries and optimize the execution of the code and/or the utilization of the system resources.

In a parallel execution environment, the word "resource" takes on a broader meaning and gives rise to a more demanding apparatus to manipulate resources. The kinds of resources encountered are physical resources such as processors, memory, interconnects, devices for i/o and mass storage, visualization and other special purpose instruments, etc. Typically, the resources are shared by multiple parallel applications. Moreover, it is desirable that programs written for such environments be able to adapt to the scalable nature of these parallel environments. Because of these considerations, in a scalable multiprocessor environment, the resource boundaries cannot be fixed at the time applications are written or even at compile time. For example, the number of processors on which an application may be run cannot be fixed a priori, or it may not be desirable to do so in order to realize the flexibility associated with scalable architectures. Furthermore, it has been observed that the data input to an application can have a large impact on the performance of the computations since concurrency and data distribution are both affected by the particular problem being solved. See J. Saltz, H. Berryman, and J. Wu, Multiprocessing and Run-Time Compilation, "Concurrency: Practice and Experience", vol. 3(6), pp. 573–592, December, 1991. In such cases, the actual resource requirements to solve a problem to completion can be known only after the inputs to the problem are defined and the utilization of these resources may be determined only during the course of the program execution. When multiprocessor systems are multiprogrammed, a new dimension is added to the scheduling problem as multiple parallel jobs compete dynamically for resources. In some research systems, as discussed in C. Polychronopoulos, "Multiprocessing versus Multiprogramming", Proceedings of the 1989 International Conference on Parallel Processing, Aug. 8–12, 1989, pp. II-223–230; A. Gupta, A. Tucker, and L. Stevens, "Making Effective Use of Shared-Memory Multiprocessors: The Process Control Approach", Technical Report CSL-TR-91-475A, Computer Systems Laboratory, Stanford University, 1991; and S. Leutenegger and M. Vernon, "Multiprogrammed Multiprocessor Scheduling Issues", Research Report RC-17642, IBM Research Division, February 1992, resources are rearranged during the lifetime of a parallel job. In the presence of multiple applications, all vying for the same resources, some form of efficient dynamic scheduling of resources is essential.

The scalable nature of parallel environments requires that an application be able to adapt to a particular configuration of the underlying system whenever it is invoked to solve a particular problem. Not only should the program as a whole be able to reconfigure, but to achieve flexibility and efficiency, the components of a program should be reconfigurable with respect to one another. For example, for any specified level of resources, the program data structures may have to be distributed suitably and the bounds for loops executed by each processor may have to be adjusted accordingly.

In summary, parallel applications developed for scalable systems with multiple resources have the following important characteristics:

i. Dynamism: Resource requirements change dynamically during the course of computations.

ii. Reconfigurability: Each stage of computations can be designed to operate under multiple levels of resources.

iii. Shareability: Applications often are required to share data and physical resources.

Thus, any resource management system for controlling of the resources associated with a parallel environment must have the following characteristics:

i. Dynamism: It should be possible to acquire and release resources dynamically on demand.

ii. Reconfigurability: It should be possible to reconfigure the allocated resources to individual applications.

iii. Shareability: It should be possible to dynamically partition the resources both in space and time.

To realize these characteristics, it is necessary for the end users and for the system itself to monitor the resources allocated to each segment of computations in an application and to steer the program to maximize the respective performance goals. In view of the above, a run-time system is necessary to integrate the resource manager and the parallel application in an intelligent manner.

PROBLEMS WITH PRIOR ART

Current parallel systems provide very limited control over resources. Often, a program requests the maximum amount of resources at the beginning and the resources are kept throughout the lifetime of the program. Thus, the resources are under-utilized in less demanding segments of the program. Furthermore, current systems do not provide any interactive control over the resources. The extent of dynamism is limited to redistribution of data structures at runtime, such as in high performance Fortran (HPF) systems. In C. H. Koelbel, D. B. Loveman, R. S. Schreiber, G. L. Steele Jr., and M. E. Zosel, "The High Performance Fortran Handbook", The MIT Press, Cambridge, Mass., 1994, there is no provision for meaningful dynamic acquisition or release of processor resources during the course of program execution. Examples of systems where parallel jobs are run on a fixed-size partition include the IBM SP2 (See Special Issue on IBM POWERParallel Systems, IBM Systems Journal, vol. 34, no. 2, 1995), the Cray T3D (See Cray Research Inc., "Cray T3D System Architecture Overview Manual", Eagan, Minn., 1994), and the Thinking Machines CM-5 (See Thinking Machines Corp., "The Connection Machine CM-5 Technical Summary", Cambridge, Mass., 1992). MPI allows dynamic acquisition and release of processors, but there is no redistribution of control or data structures. See Message Passing Interface Forum, "MPI: A Message-Passing Interface Standard", May, 1994.

We elaborate the above points in the following.

Existing art allows limited manipulation (i.e., allocation/deallocation and scheduling) of processors and memory to parallel applications. For example, prior to beginning the execution of a parallel application on a multiprocessor system, a user can ask for a specific number of processors or ask for processors that fall within a range. However, during the course of execution, processors cannot be explicitly allocated and deallocated in a manner similar to the way memory can be allocated and deallocated in a uniprocessor environment. In a pure shared memory environment, using the process fork mechanism, one can create processes dynamically during the course of execution, which in turn can be served by a pool of processors. Thus, under such an environment, services of additional processors may be obtained implicitly. Similarly, threads can be created dynamically to make use of a variable number of processing elements. However, in both cases, compile-time and run-time optimizations (such as minimization of memory accesses by cache, and register reuse) cannot be fully performed because of the dynamic data-sharing introduced in these models. Examples of research in dynamic control of processors for shared-memory environments are discussed in C. McCann, R. Vaswani, J. Zahorjan, "A Dynamic Processor Allocation Policy for Multiprogrammed Shared-Memory Multiprocessors" ACM Transactions on Computer Systems, vol 11(2), pp. 146–178. May, 1993; C. Polychronopoulos, "Multiprocessing versus Multiprogramming", Proceedings of the 1989 International Conference on Parallel Processing, Aug. 8–12, 1989, pp. II-223–230; and A. Gupta, A. Tucker, and L. Stevens, "Making Effective Use of Shared-Memory Multiprocessors: The Process Control Approach", Technical Report CSL-TR-91-475A, Computer Systems Laboratory, Stanford University, 1991. In a distributed memory environment or in a hierarchical memory environment where a portion of the address space of a process spans over some private/local memory and the rest over a shared memory, one cannot use just the process forking or thread creation mechanisms to adjust the computations to changes in the available resources. Additional mechanisms—such as rearrangement of data structures and/or data movement across the memory hierarchy—may be required. Such mechanisms are absent in the existing systems. Thus, in such environments, it is not possible to dynamically manipulate allocation/deallocation and scheduling of processing resources, even in an implicit manner. In summary, on distributed systems allocation/deallocation of processors during the program execution is not possible; for shared memory systems, while it is possible to allocate/deallocate processors, compile time optimizations are not possible, to their fullest extent.

These are shortcomings in manipulation of the physical resources other than memory. There are also limitations in the manner in which memory is managed. (By memory we mean the storage location where most of the application data and instructions reside.) However, the issues in memory management are somewhat different. First of all, in existing systems, memory can be allocated and deallocated from both local and shared memory, so long as the memory is within the addressing scope of the memory allocating processor. This can be done just as efficiently as in the uniprocessor environment. It is not possible, however, in the existing systems, either explicitly or implicitly, to allocate memory outside the addressing scope of the processors on which the application is currently being executed.

OBJECTS OF THIS INVENTION

A first object of the invention is to provide a new method of organizing a program into modules such that computations within each module can adapt, in a flexible manner, to various configurations of resources made available to that module at run-time.

Another object of the invention is to provide a new method of structuring a program into modules such that decisions regarding allocation of system resources to a program can be made at the module-level and such that system resources can be scheduled to perform the computations of a module in a manner independent of the scheduling used for other modules.

Another object of the invention is to provide a new method of specification of data structures within a module such that at run-time data can be rearranged over the memory hierarchy just prior to beginning the computations within that module.

Another object of the invention is to provide an improved compiler apparatus that can optimize computations within a module by taking advantage of data locality without knowing the exact number of processing resources allocated to that module.

Another object of the invention is to provide an improved compiler apparatus that can incorporate optimizations for data movements that may take place during the course of computations of a module, without having full information about the exact nature of the allocated processing resources or the exact organization of data at the time computations are performed.

Another object of the invention is to provide an improved compiler and run-time apparatus for efficient data movement and data reorganization across module boundaries during the course of the computations, including the support of data spaces that span multiple address spaces.

Another object of the invention is to provide an improved run-time apparatus that facilitates spawning of computations for remote processors in a parallel or distributed system.

Another object of the invention is to provide an innovative run-time apparatus that can provide facilities with which applications and libraries can provide on-demand execution services to other unrelated applications.

SUMMARY OF THE INVENTION

In this invention, we propose a methodology by which resources in a scalable parallel environment can be controlled in a more sophisticated manner than that which has heretofore been available in parallel programming environments. The approach comprises the following components:

i. A scheme for annotating and instrumenting application program segments such that (a) each segment can operate at multiple resource levels, and (b) the program segment can be reconfigured at run-time to execute with a specified resource level. These annotations and the associated instructions may be generated by a programmer, by a pre-processor, by a compiler, by a library call, by a run-time system, or by combination of these. All are within the scope of this invention.

ii. A run-time system that monitors the progress of a program and provides an interface to a user and/or to a system-wide resource coordinator at each point in the program at which resource revisions and reconfigurations are amenable.

iii. A run-time system that takes a given allocation of resources during the course of a program execution and reconfigures the data and control structures as dictated by the annotations.

We propose an apparatus that incorporates the above methodology to implement the above features on a parallel system.

FIGURES

DETAILED DESCRIPTION

Figure 1:
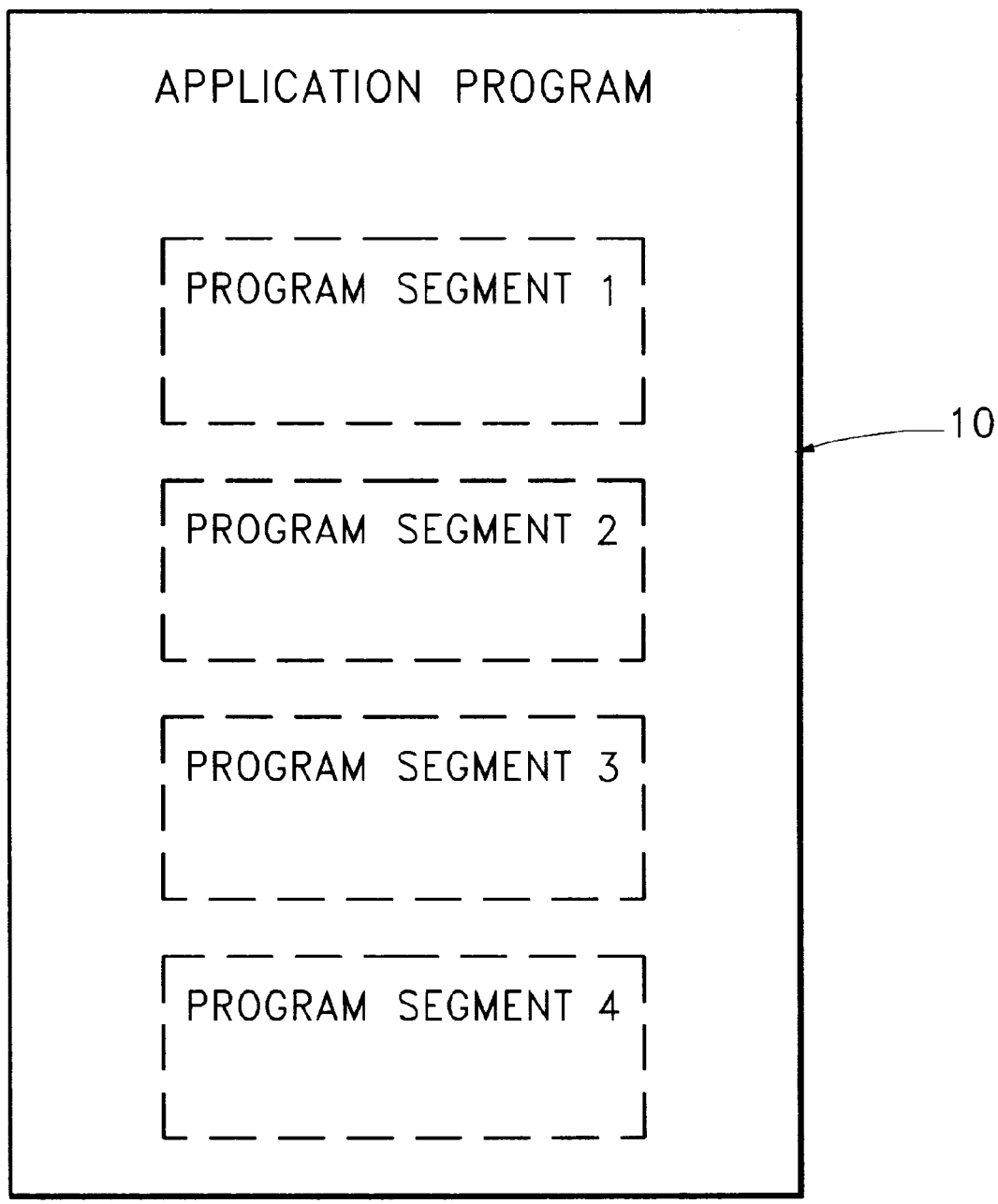
FIG. 1 is a conceptual view of a computer program.

Shown in FIG. 1 is the structure of an application program. In that figure, the application program has four logical components which are labeled as "Program Segment 1", "Program Segment 2", "Program Segment 3", and "Program Segment 4". Such sectioning of a program into segments could be based on several different considerations, such as the nature of the control structure of the program (e.g., computations may progress in phases, with each phase having its own control structure), changes in the manner in which data structures are used, changes in the data access pattern, changes in the level of parallelism, and so on. Although we have shown four program segments (PS), one may be able to divide an application program into more or less than four segments. An application program could be viewed in this manner either prior to compile time (in its static form) or at run-time (in its dynamic form). In the following description, we assume both forms.

Each PS has its own set of resource requirements; for example, a certain amount of memory is required to complete the computations of a PS or a certain minimum number of cpu cycles must be spent to perform the computations. The resource requirements of a PS are constrained by various factors. For example, resources required for the completion of computations of a PS are affected by the parameters input to the application program and may also depend on the outcome of the computations preceding the entry to that PS. Thus, the constraints on the resource requirements of a PS may be expressed in terms of the parameters input to the application program and/or in terms of the outcome of the computations at preceding PSs. In addition, the resource requirements may be inter-related; that is, the quantity and the type of a resource may influence the quantity and the type of another resource necessary to complete the computations. For example, depending on the type of computations and memory access and storage patterns involved, the degree of parallelism may vary from one PS to the next. Therefore, the amount of memory required may depend on the number of processors used in performing the computations of a PS. Moreover, the constraints may allow use of a range of values in determining the quantity of that resource required. Utilization of that resource, however, may vary within that range.

Figure 2:
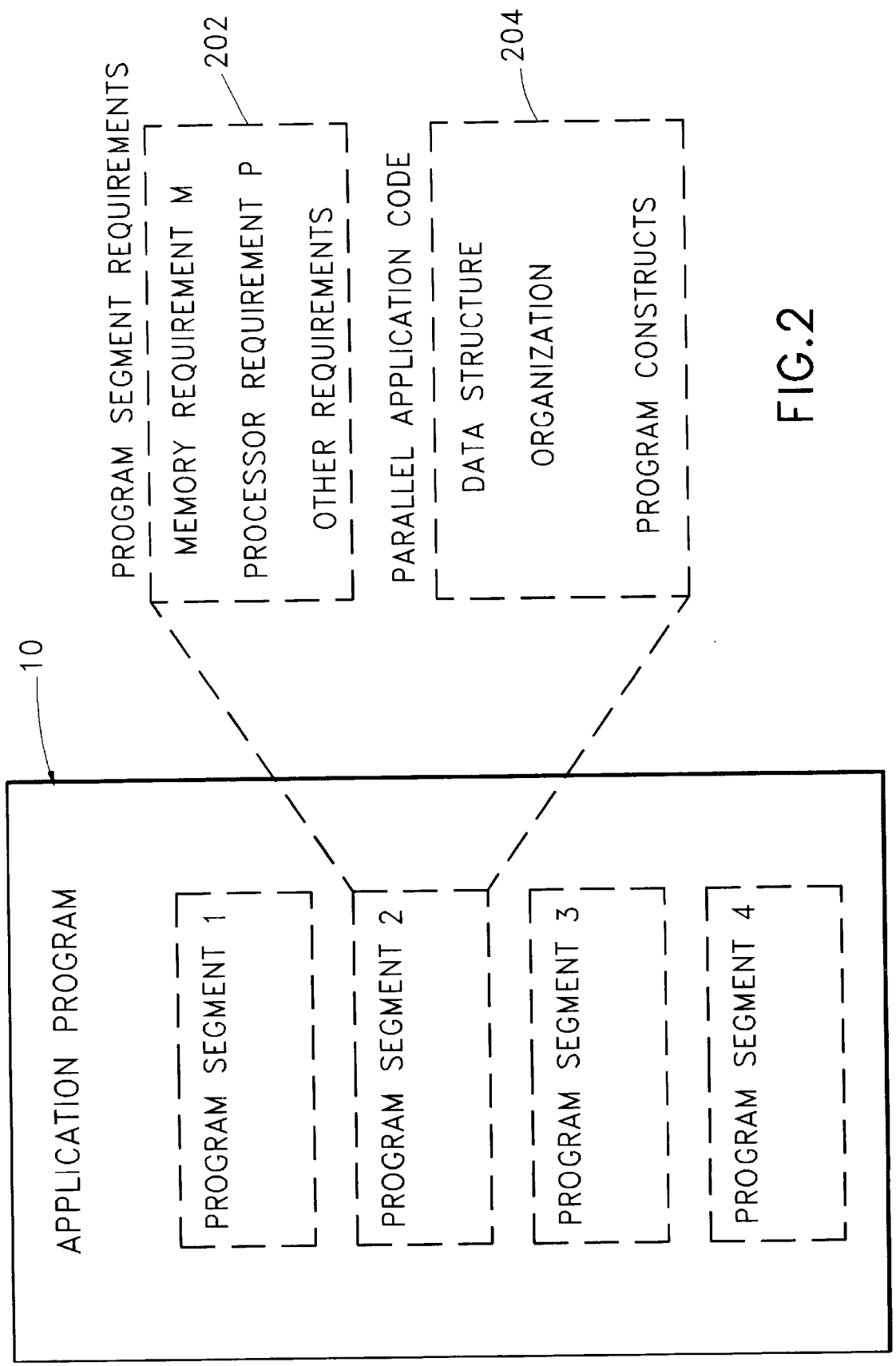
FIG. 2 is an expanded view of a computer program segment in accordance with the present invention.

Thus, in an application each PS is associated with a set of resources, each of which may have various constraints, and each resource may have its own degree of effectiveness, which may vary over the range, in delivering a desired level of performance. In FIG. 2, we illustrate this for our example application program 10 by expanding the view of Program Segment 2 (PS2). Other program segments can be viewed in a similar manner. In the expanded view of PS2, box 202 represents the information on the resource requirements and constraints, and the utility of these resources. For example, box 202 can include information such as a memory requirement m, a processor requirement p, and other information. Box 204 represents the application program. In allocating resources at run-time, if one makes use of these program segment requirements, then the available resources can be used judiciously.

The invention presented here proposes that each PS be organized such that the resource dependent variables in the body of the application program code associated with that PS are initialized at run-time; the resource dependent data structures are specified so that data distributions are arranged at run-time after the resources are specified. Further, we propose that the main body of the application program code associated with the PS be constructed so that it can be executed with more than one level of resources and so that it can operate on data, the exact organization of which may be determined only at run-time. We provide examples to illustrate how programs can be organized in this manner. We propose a scheme that makes use of programs written in this manner to control and use resources efficiently.

Figure 3:
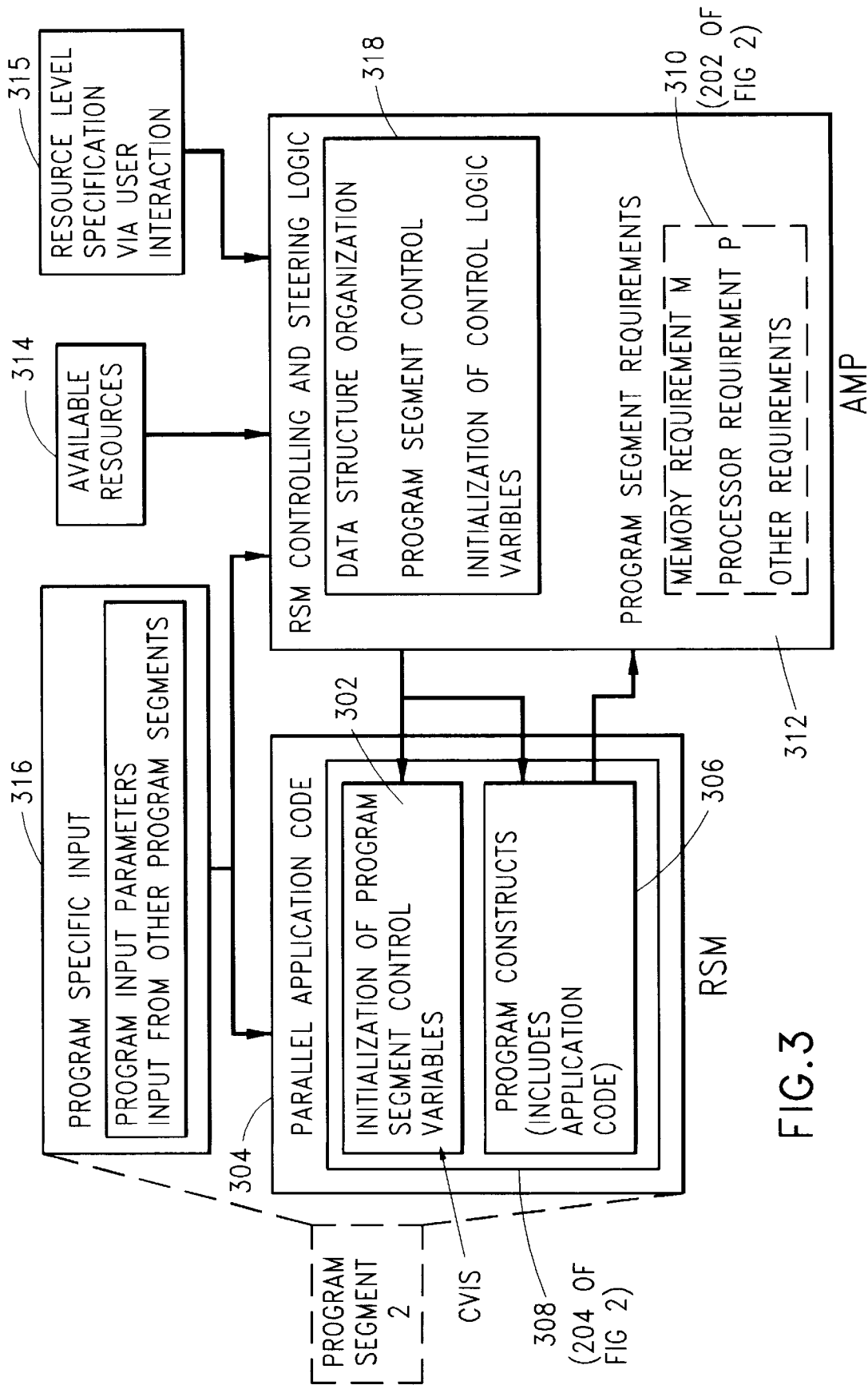
FIG. 3 is a further expanded view of a program segment in accordance with the present invention.

Under the proposed scheme, the range of resources over which the data structures can be manipulated and over which the code can execute correctly is specified in an auxiliary information section associated with the PS shown in box 202 of FIG. 2. The use of this auxiliary information is illustrated in FIG. 3. In that figure, for simplicity, only PS2 is considered. The application code 308 of a PS is separated out into two parts: (i) a special initialization part (block 302), and (ii) the part corresponding to the application program itself (block 306). The first part consists of code for initialization of the control variables used in the program segment of the second part. The first part is referred to as the control variables initialization section (CVIS), block 302. All resource dependent control structures present in the program segment in block 306 are written in terms of the control variables initialized in CVIS. This program segment is referred to as the program construct. The variables in CVIS are set using the information on the actual allocated resources, as described below. After these variables are initialized, the resource dependent control structures in the program constructs 306 associated with that PS are completely specified. The program constructs 306 of the PS are organized such that all resource dependent control structures can be expressed in terms of the control variables initialized in CVIS 302. Thus, the program constructs take a flexible form so that the computations of that PS can be reconfigured and scheduled in many different ways.

The CVIS 302 and flexible program constructs 306 together form a reconfigurable and schedulable module (RSM) 304. The program constructs 306 in an RSM may be the user program (as in the original application program) or may be a segment of code from a run-time library or may be an invocation of another independent object or a combination of all. All of these possibilities are within the scope of this invention.

Associated with each RSM is a program segment requirement block 310, which includes information on the segment's resource requirements, such as identification of the resources, the constraints on the types and quantities, their inter-relationships, their relationship to problem specific input parameters, and other information such as the utility of each resource over a range of values. This information may be in the form of a table, a database or another program. It may be generated by the user, by a pre-processor, a compiler, or a run-time system.

Also associated with the RSM is the RSM controlling and steering logic 318. This logic, along with the program segment requirement information 310 forms an auxiliary module program (AMP) 312. Using the run-time information on the available resources 314 and 315, and the problem specific input 316, the RSM controlling and steering logic 318 processes the resource information to determine the values of the control variables set in CVIS 302. The steering logic 318 may also include the capability to determine exactly which executable code is to be invoked as part of the program constructs 306 of the RSMs. In addition, logic 318 performs the appropriate data structure organization so that available resources can be used with the selected program constructs. The resources to be used may be specified by the system (314), by the user in an interactive manner (315) or may be directed by the results of previous segments (316).

An Example Implementation

In this section, we illustrate our methodology with the help of a specific implementation. Note that the scope of this invention is not restricted to any particular architecture or programming model.

The particular configuration discussed here consists of a distributed memory system where each processor has its own private local memory space. For these type of architectures, the combination of all the local spaces form the global problem space. For each private location in a processor's space, there is a corresponding location in the global space. The compiler and run-time system provide a uniform memory model that programmers can use to write resource-independent code.

In this implementation, application programs are delineated into program segments. Each program segment has annotations specifying the set and the range of resources over which that program segment can operate. In the examples presented below, the data structures are specified using the HPF abstraction for data distributions. This is done only for convenience. Program constructs are then developed using these data structures. For each program segment, a special compiler generates the RSM and corresponding AMP components. At run-time, the exact resources are determined and the run-time system initializes the variables specified in the CVIS of each RSM. This is followed by the execution of the application code in that RSM. The details on the complier and run-time system mechanisms are given in the following.

Note that this implementation differs from an HPF implementation in that it is able to vary physical resources allocated to the program at run-time.

By separating resource allocation and application code, users can develop programs that work correctly and efficiently with various instantiations of physical resources.

The issues discussed above are further elaborated in the following.

Annotations

We consider a program that is a sequence of annotated program segments. From these annotations, each segment is prefixed with resource specifications as described below.

In these examples, it is assumed that resources and their domains of values are referred to by predeclared names that are mutually understood by the program and the run-time system. For instance, the phrase nproc $\{2, 4, 8\}$ means that the number of processors can be either 2 or 4 or 8. The implementation of the run-time system ensures that the number of processors is indeed so and the variable nproc is set to the actual number of processors allocated. A program may use the variable nproc in other expressions. In general, an annotated segment has the following form:

| | |
|---|---|
| with | $R_1\{r_{11}, r_{12}, \ldots, r_{1k}\}$, |
| | $R_2\{r_{21}, r_{22}, \ldots, r_{2m}\}$, |
| | ... |
| do | |
| | {code} | where $R_1$, $R_2$ are the resource names and the values inside the braces are permissible values for the resource from its respective domain. The meaning of the above segment is that the code segment following the resource statements is guaranteed to execute with one of the permissible values assigned to each resource. Furthermore the application's do clause {code } may contain a preamble to do the necessary reconfigurations, as illustrated by the following example:

| | |
|---|---|
| with | nproc $\{4,9,16\}$, |
| | display $\{$video$\}$ |
| do | { |
| | n = sqrt(nproc) |
| | redistribute A onto processors (n,n) |
| | ub = dimension_of (A)/n |
| | for(i=1; i<=ub; i++) |
| | ... |
| | compute matrix |

-continued

```
          . . .
          move filter(A) to display
    }
```

The piece of code is provided by a programmer or it may be generated from another program. How it is produced is irrelevant for this discussion. The methodology presented here requires that the program segments be produced in the above 'with' and 'do' type format (or the equivalent). Here the program needs 4, 9 or 16 processors and a video display. The program redistributes the matrix A onto an n×n grid of processors and computes its elements. It then applies some filter function to the elements and sends the filtered data onto a display. The display variable contains the necessary information to access the device. The move command has implicit semantics to funnel the distributed data in some standard (e.g., column major) order to the device. Additional parameters can be specified to control any other parameters associated with a device or data movement.

In the above example, the information in the with clause is used by the compiler to generate the corresponding AMP. The declarations in the do clause are used to initialize the control variables of the program segment. Specifically in this example, n(=sqrt(nproc)) and ub are control variables that are assigned values as soon as nproc is assigned a specific value. A is a distributed data structure whose exact distribution is again fixed when nproc is known. Code in the do clause (in 'for' loop in the above example) is usually parameterized on control variables (e.g., variables n and ub), allowing it to adjust to actual resources.

As another example, consider the following. In this example, a program (called main-program) must invoke another program (called cfd-program) on a separate set of processors, at some point during the course of its execution. The 'with' clause specifies that to execute the code in the program segment (of main-program) shown, the program cfd-program should be up and running on 4, 9 or 16 processors. The main-program communicates a distributed data structure A to the cfd-program as its initial data and later receive the results from the cfd-program. The keyword newjob creates a new job with the name cfd-program for which either 4, 9 or 16 processors are required. These processors form a separate partition, in addition to the set of processors on which the main-program is currently running. (For clarity, we have not indicated the number of processors on which main-program is running.) The program cfd-program is loaded onto this new partition. (Note that we have not shown cfd-program.) The cfd-program is designed to initialize itself and to make a request for initializing data—this request is satisfied by the init-signal in main-program. The move command moves the contents of A from main-program into the contents of B in the cfd-program. The run-time system will automatically perform the necessary transfers so that after the transfer, the standard linearization of the distributed structure A in main-program will be identical to that of the distributed structure B in cfd-program.

Main Program:

```
    with     newjob {prog {cfd-program}, nproc{4,9,16}}
    do       {
             wait for init-signal
             move A into cfd-program.B
             send start-signal
             . . .
             wait for completion-signal
             move cfd-program.B into A
             . . .
    }
```

Specification of Data Structures

For a parallel program to execute correctly when resources, such as processors, are changed during the course of execution, data must be dynamically rearranged across the memory hierarchy of a parallel system.

In the implementation described here, a parallel application consists of a collection of programs, each running on a separate processor. The program running on each processor maintains the data structures local to it. Also, the program can directly access only its local data structures (i.e., local to the processor on which the program is running). The data structure declarations described here specify the relationship between global data space of the application and the local data space of each program running on a processor. We reiterate that by using these features the user can construct programs that are independent of the physical resources instantiated at any particular execution.

The declaration of data structures is performed at the beginning of a module. It is illustrated in the following example:

```
    with     nproc {4,9,16}
    do       {
             n = sqrt(nproc)
             real A(m,m)
    i.       processors p(n,n)
    ii.      distribute A(block,cyclic) onto p
             compute matrix A
             }
```

The specification of the relationship between global and local data spaces is performed in two phases denoted by (i.) and (ii.) in the above program.

Phase i. Here a grid of n×n (virtual) processors is declared by p(n,n). As indicated by the initialization statement, n is the square root of nproc (the number of physical processors). Thus, all $n^2$ physical processors get mapped to $n^2$ virtual processors in a one-to-one correspondence. In our example implementation, the following mapping is adopted: let the physical processors be numbered 0,1, . . . ,nproc−1; then p(i,j) ↔physical processor(j−1)*n+(i−1).

Other mapping schemes can also be used.

Phase ii. The relationship between the local storage for matrix A in each processor belonging to processor grid p and the global data space for A is specified. The specification is per dimension axis of the matrix array A as indicated in the example. The first axis of A is mapped according to a block distribution, while the second axis of A is mapped according to a cyclic distribution. This means that local element A(x,y) in processor p(i,j) corresponds to global element A((i−1)* m+x, (y−1)*n+j). By providing this means to convert between local and global indices dynamically, we allow the program to operate in terms of global indices (which are invariant) and then automatically translate to local indices when it is necessary.

A compiler that understands the annotations in the program segments shown above will convert the program segments into RSMs of AMPS. The RSM consists of initialization statements of the program segment control variables and the code in terms of these variables. The AMP specifies the possible values the variables can take. In the executable, each RSM is preceded by its AMP.

Annotations in the "with" clause specify the resource requirements for correct execution of the program segment. The compiler uses these annotations to generate the Program Segment Requirements (PSR) block (block 310) of AMP (block 312). In the general case, the requirements assume the form of expressions that specify an acceptable range of resources for the execution of the segment. The exact determination of the range bounds may have to wait until run-time when several factors, such as user interaction, input data, intermediate results, and communication with other programs, may be used in the evaluation of the expressions. The combination of the resource requirements (when finally computed at run-time), available resources, and particular resource allocation method used, will determine the exact number of resources that a program segment obtains.

Annotations in the "do" clause specify the organization of data structures and describe computations in terms of a global index space. The compiler uses these annotations to generate the RSM Controlling and Steering Logic (CSL) block (block 318) of AMP and the Control Variable Initialization Segment (block 302) of RSM. For the CSL, the compiler generates descriptors of the organization of the global data and generates code and data based on these descriptors for use by the run-time system. The descriptors include the index mapping information, data distribution and data type information, ownership information, and any other data layout information specific to that program segment. The run-time system makes use of this information in organizing the data as a function of the available resources. We describe details on the run-time system mechanism later. The compiler also makes use of the descriptors in generating the appropriate code for the program constructs (block 306). The compiler also generates code that computes the values for the control variables that will steer the flow of computation in the program constructs. In the general case, these descriptors and control variables cannot be completely computed at compile time and have to be filled in with information on the actual resources allocated to the segment. For the CVIS, the compiler generates code that initializes the variables using the information on data structures and resources allocated for the segment.

Inside the program constructs (block 306), the compiler also uses the information on the organization of the data structures to translate the computations described on a global index space. These computations are translated to equivalent executable code involving only computations on a local index space and inter-processor communication. The resulting code can then be executed directly by the processors.

Run-time System

To utilize the flexibility associated with the programs organized and compiled in the manner described above, a special run-time system (RTS) is implemented. During the course of the program execution, whenever the program completes the execution of an RSM, the control is passed to the RTS. The RTS has the access to the AMP of the next RSM and from that it determines the list of resources and the valid range for each resource necessary to execute the next RSM. Some of this information may be parameterized by the program input and by the values computed in other RSMs. In such cases, the RTS may execute additional code in the AMP to determine the actual resource range in that particular instance of the execution. Such code is inserted by the compiler. By interfacing with a system-wide resource coordinator, the RTS acquires a valid set of resources for the execution of the next RSM. The system-wide resource coordinator has knowledge about the available resources and makes a decision on what resources to allocate to this application during the execution of the current RSM. Mechanisms used by the resource coordinator are irrelevant for this discussion. (The RTS is also capable of interfacing with the user so that the user can steer the computations with the help of the run-time system as shown in block 315 of FIG. 3. (This is elaborated later in this section.) After the exact set of resources are available, RTS executes the controlling and steering logic present in the AMP. The control logic in the AMP (put in place by the compiler) allows the RTS to keep track of the descriptors for all resource dependent data structures associated with that program segment. It also provides all information about processors and index mappings. Each distributed data structure is registered in the AMP, along with its distribution attributes. Note that the RTS may optimize its operations and may not always perform all the above described steps if they are not necessary; for example, if the level of resources does not change then there is no need to perform data redistributions. When there is a change in data distribution or when a distributed data structure is newly introduced (which is indicated in AMP), the run-time system executes data distribution code so the appropriate distributions are in place prior to executing the next RSM.

When a distributed data structure is newly introduced to the run-time system, a handle for that data structure is created. Based on the compiler-created descriptor, the handle specifies the mapping between the global data space (where the distributed data structure is defined) and the local data spaces of the individual processors (where each element of the data structure resides). This handle supports the translation from global to local index spaces (the local index specifies the exact location of an element), and thus the access of any element given its global index.

When a redistribute operation on a distributed data structure is performed, a change in mapping between global and local spaces occurs. A new handle is created that specifies different locations for the elements. Data has to be reorganized to conform to this new specification. This reorganization is achieved through data movement both inter- and intra-processor. Using both the old and new handles, each processor computes the set of elements that it has to send to each other processor, and sends them. It also computes the set of elements it has to receive from each other processor and receives them. This is complemented by each processor computing the new location for the original elements that remained in the processor.

Each task of a parallel application is associated with an RTS and all RTS's associated with that application work in cooperation with one another. When a change in a level of resources requires moving or reorganizing a data structure, each RTS executes the code in the associated AMP to compute the segment of data that must be reorganized. The data reorganization takes into account any possible optimization. For example, in case of a distributed memory system where data movement is via message passing, data movement is brought about by using at most one message exchange between any pair of processors. The receiving processors can compute the indices at which the received data must be stored. Such optimizations are possible because of the instrumentations for data movement provided in the AMP. The RTS also provides signals to communicate among the processors, in order to implement a variety of protocols. This allows, for example for, invocation of a new program from within a program or communication of data with different structural organizations among independent programs.

We now briefly elaborate how with the framework described above, it is possible for users to interactively control and steer the computations as well as the resources allocated to a program during the course of its execution. In the framework described here, a program is delineated into program segments where each segment consists of an RSM and a corresponding AMP. When interactive steering is enabled, prior to executing the code in the RSM, the run-time system allows the user to specify or to override resource level settings put in place by the program or by the system. Similarly, the user interaction can specify settings for evaluating control structure and, thus, steer the computations in a particular direction. In short, the framework allows the user to set resource levels at the program segment level, in the same manner it allows the system or the application to set resource levels. This is indicated by block 315 in FIG. 3.

While the invention has been described in particular with respect to preferred embodiments thereof, it will be understood by those skilled in the art that modifications to the disclosed embodiments can be effected without departing from the spirit and scope of the invention.

We claim:

1. A method for controlling allocation of resources to an explicitly parallel application in a scalable parallel environment, comprising the steps of:

organizing an explicitly parallel program into program segments;

annotating each program segment with code specifying allowable resource levels for executing the program segment;

configuring each program segment at run time to execute with one of the allowable resource levels for that segment made available at run-time.

2. The method of claim 1, wherein the step of annotating comprises generating annotations automatically with a compiler.

3. The method of claim 1, further comprising monitoring the execution of the program and revising the level of resources assigned to a program segment if necessary.

4. The method of claim 1, wherein each program segment is reconfigurable to operate with a plurality of multiple processor and memory configurations.

5. The method of claim 1, wherein each segment has a predefined structure.

6. The method of claim 5, wherein the predefined structure comprises:

a main body of functional code that accomplishes application specific computations associated with that segment; and an auxiliary module program including information describing the resource levels under which the segment can be executed.

7. The method of claim 6, wherein one auxiliary module program is associated with a plurality of segments.

8. The method of claim 1, wherein each segment has a different control structure.

9. The method of claim 1, wherein the program is divided into segments prior to compilation of the program.

10. The method of claim 1, wherein the resources allocated to a program segment depend upon the parameters input to the segment and the results of computations of parameters at other segments in the program.

11. The method of claim 1, wherein resource dependent variables of the code in each segment are initialized at run-time, after the resources are specified.

12. The method of claim 1, wherein resource dependent data structures in each segment are organized in a memory hierarchy at run-time, after the resources are specified.

13. The method of claim 1, wherein each segment comprises a reconfigurable and schedulable module (RSM), the RSM comprising a control variable initialization section and program constructs organized such that all resource dependent control structures in the program constructs can be expressed in terms of initialized variables.

14. The method of claim 13, wherein the program comprises program code embedded in the functional code of the segment.

15. The method of claim 1, wherein the resource levels include number of processors, amount of memory, i/o related resources, visualization devices, file systems and other hardware and software resources.

16. The method of claim 1, wherein the step of configuring each program segment is accomplished independently of configuration decisions for the other program segments.

17. The method of claim 1, wherein the step of configuring each program segment comprises executing code instrumented for that program segment and for a range of resources.

18. A system for controlling allocation of resources to a parallel application in a scalable parallel environment, comprising:

means for organizing an explicitly parallel program into program segments;

means for annotating each program segment with code specifying allowable resource levels for executing the program segment;

means for configuring each program segment at run time to execute with a resource level specified in the annotation for that segment.

* * * * *